(12) United States Patent
Suzuki (10) Patent No.: US 12,202,776 B2
(45) Date of Patent: Jan. 21, 2025

(54) HONEYCOMB STRUCTURE AND MANUFACTURING METHOD OF THE SAME

(71) Applicant: NGK Insulators, Ltd., Nagoya (JP)

(72) Inventor: Hiroaki Suzuki, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 782 days.

(21) Appl. No.: 17/305,191

(22) Filed: Jul. 1, 2021

(65) Prior Publication Data

US 2021/0323882 A1    Oct. 21, 2021

Related U.S. Application Data

(63) Continuation of application No. PCT/JP2020/006815, filed on Feb. 20, 2020.

(30) Foreign Application Priority Data

Feb. 28, 2019    (JP) .................................. 2019-035084

(51) Int. Cl.
*C04B 41/50* (2006.01)
*B01D 46/00* (2022.01)
(Continued)

(52) U.S. Cl.
CPC ...... *C04B 41/5059* (2013.01); *B01D 46/0001* (2013.01); *B01D 46/009* (2013.01);
(Continued)

(58) Field of Classification Search
CPC ........ B01D 2255/9155; B01D 2279/30; B01D 46/0001; B01D 46/009; B01D 46/2425;
(Continued)

(56) References Cited

U.S. PATENT DOCUMENTS

2006/0121240 A1    6/2006    Hirai et al.
2006/0216467 A1*    9/2006    Yoshida ................ C04B 37/005
                                                                    428/116
(Continued)

FOREIGN PATENT DOCUMENTS

JP    2003-137677 A1    5/2003
JP    2004-231506 A    8/2004
(Continued)

OTHER PUBLICATIONS

Ueda et al. JP2018104267A English Translation (Year: 2018).*
(Continued)

*Primary Examiner* — Sally A Merkling
*Assistant Examiner* — Jordan W Taylor
(74) *Attorney, Agent, or Firm* — BURR PATENT LAW, PLLC (57) ABSTRACT

A honeycomb structure includes a pillar-shaped honeycomb structure body having a porous partition wall so as to surround a plurality of cells extending from a first end face to a second end face, and a circumferential coating layer composed of a circumferential coating material coated on at least a part of circumference of the honeycomb structure body, wherein the circumferential coating layer has a printing area for printing on the surface thereof, the printing area has a lightness (L*) in L*a*b* color space (CIE1976) defined by International Commission on Illumination (CIE) of 35 or more, and the printing area has a surface roughness Ra of 30 μm or less.

11 Claims, 2 Drawing Sheets

(51) Int. Cl.
*B01D 46/24* (2006.01)
*B01D 53/94* (2006.01)
*B01J 33/00* (2006.01)
*B01J 35/56* (2024.01)
*B01J 37/02* (2006.01)
*C04B 38/00* (2006.01)
*C04B 41/00* (2006.01)
*C04B 41/45* (2006.01)
*C04B 41/87* (2006.01)

(52) U.S. Cl.
CPC ..... *B01D 46/2455* (2013.01); *B01D 53/9454* (2013.01); *B01J 33/00* (2013.01); *B01J 35/56* (2024.01); *B01J 37/0215* (2013.01); *C04B 38/0006* (2013.01); *C04B 41/009* (2013.01); *C04B 41/4545* (2013.01); *C04B 41/87* (2013.01); *B01D 2255/9155* (2013.01); *B01D 2279/30* (2013.01)

(58) Field of Classification Search
CPC ............ B01D 46/2444; B01D 46/2455; B01D 53/9454; B01J 33/00; B01J 35/56; B01J 37/0215; C04B 2111/00793; C04B 2111/0081; C04B 2111/80; C04B 2235/3217; C04B 2235/3232; C04B 2235/3418; C04B 2235/3481; C04B 2235/428; C04B 2235/5436; C04B 2235/5454; C04B 2235/5472; C04B 2235/6021; C04B 2235/658; C04B 2235/963; C04B 35/565; C04B 35/573; C04B 35/62222; C04B 35/62655; C04B 35/638; C04B 38/0006; C04B 38/0012; C04B 41/009; C04B 41/4545; C04B 41/5059; C04B 41/52; C04B 41/87
See application file for complete search history.

(56) References Cited

U.S. PATENT DOCUMENTS

| | | |
|---|---|---|
| 2006/0269722 A1 | 11/2006 | Yamada |
| 2011/0224071 A1* | 9/2011 | Okumura ............... B41M 5/262 427/596 |
| 2014/0171288 A1 | 6/2014 | Okayama et al. |
| 2017/0002205 A1* | 1/2017 | Murai ................... B01D 46/00 |
| 2018/0273432 A1* | 9/2018 | Tokuda .............. B01D 46/2476 |

FOREIGN PATENT DOCUMENTS

| | | | | |
|---|---|---|---|---|
| JP | 2011-206764 A1 | 10/2011 | | |
| JP | 2013-133252 A1 | 7/2013 | | |
| JP | 2014-198653 A1 | 10/2014 | | |
| JP | 2016-055282 A1 | 4/2016 | | |
| JP | 2016055282 A | * 4/2016 | ......... B01D 46/2418 |
| JP | 2018104267 A | * 7/2018 | ............ B01D 46/00 |
| WO | 2006/126278 A1 | 11/2006 | | |
| WO | 2012/115136 A1 | 8/2012 | | |
| WO | 2015/111618 A1 | 7/2015 | | |
| WO | 2016/152693 A1 | 9/2016 | | |

OTHER PUBLICATIONS

Ito et al. JP2016055282A English Translation (Year: 2016).*
AJ International Search Report and Written Opinion (Application No. PCT/JP2020/006815) dated Apr. 14, 2020.
Japanese Office Action (Application No. 2021-502139) dated Jan. 17, 2023 (with English translation).
Japanese Office Action (with English translation) dated Aug. 23, 2022 (Application No. 2021-502139).

* cited by examiner

HONEYCOMB STRUCTURE AND MANUFACTURING METHOD OF THE SAME

BACKGROUND OF THE INVENTION

Field of the Invention

The present invention relates to a honeycomb structure and a manufacturing method of the same. More specifically, the present invention relates to a honeycomb structure having a circumferential coating layer with a display area for providing a display on the surface thereof, and a manufacturing method thereof.

Description of the Related Art

Heretofore, honeycomb structures made of ceramics have been used in broad use applications such as a catalyst carrier for automobile exhaust gas purification, a purifying filter for removing particulate matter in exhaust gas, and a heat reservoir for a burning device. For example, honeycomb structure includes a porous partition wall disposed so as to surround a plurality of cells extending from first end face, which is one end face, to the second end face, which is the other end face.

In recent years, there have been many cases in which honeycomb structure is used for various purposes and objects, and a large number of the honeycomb structures are manufactured in accordance with each application and the like. Therefore, it is difficult to visually distinguish these honeycomb structures from the appearance shape and the like. When manufacturing of the honeycomb structure is completed, information required for subsequent product management (e.g., product management information) may be attached to the honeycomb structure.

Specifically, the product management information is directly printed on the circumferential surface of the honeycomb structure by using a printing technology such as laser marking. Consequently, it is possible to directly visually recognize, from the outside, a type of the honeycomb structure, a product number of the honeycomb structure and the like. It is to be noted that here, the product management information may include, for example, various pieces of information such as a product name, the product number (a model number), a manufacturing number (a lot number), a manufacturing time, a manufacturing place, and a manufacturing line number.

Further, for the purpose of enabling collective display and management of a plurality of the above-mentioned product management numbers, printing two-dimensional codes such as a well-known barcode and QR code (registered trademark) on the circumferential surfaces of the honeycomb structure is increasing in place of printing numbers or characters thereon. It is to be noted that, "printing" in this specification means not only directly displaying information such as characters and numbers, but also reproducing various symbols such as a one-dimensional code and a two-dimensional code in a desired area.

The information concerning each honeycomb structure is easily obtained from the two-dimensional code printed on the circumferential surface, by using a reading device such as a barcode reader for exclusive use. Consequently, an operator or a checker can confirm the information converted into recognizable characters and numbers in a display screen or the like.

As a result, for example, it is possible to easily and immediately acquire various types of information about the honeycomb structure in a period from the completion of the manufacturing of the honeycomb structure until the honeycomb structure is mounted as a part of a car or the like. For example, it is possible to easily acquire the travel route, the quantity of stock in a period from when the honeycomb structure is conveyed into a warehouse until the honeycomb structure is actually used, the storage period, the storage location, the current condition, and the like, of each honeycomb structure. This enables traceability of information on each honeycomb structure, and enables the immediate acquisition and use of the above-mentioned information. Therefore, the printing of the product information and the like on the circumferential surface of the honeycomb structure is extremely useful in terms of the product management.

The printing of the product information such as a two-dimensional code on the circumferential surface of the honeycomb structure is performed, for example, by a well-known printing and print technology such as laser marking or ink jet printing.

For example, a technique in which a circumferential coating layer containing laser-color developing raw material powder is provided on the circumferential surface of the honeycomb structure, and laser marking is performed on the surface of the circumferential coating layer, has been proposed (see Patent Document 1).

[Patent Document 1] JP-A-2016-55282

SUMMARY OF THE INVENTION

Conventionally, as a method of printing on the circumferential surface of the honeycomb structure, the above-mentioned laser marking or ink jet printing has been used in many cases, but either method had the problem that the printed characters and the like were difficult to read. In particular, a symbol such as a two-dimensional code or the like needs to be decoded by a reading device, and when reading by the reading device is difficult, the acquisition of the information becomes extremely difficult. For example, printing of characters, numbers, and the like may be able to make predictions about the information from the appearance of the printed characters. However, when it is difficult to read a symbol such as a two-dimensional code by the reading device, it may become impossible to acquire any of the information. It should be noted that, although the description has been given to the effect that predictions about the information can be made regarding printing of characters, numbers, and the like, there remains a doubt regarding the accuracy of the obtained information, so that the printing of characters, numbers, and the like is also required to be performed with good readability.

The present invention has been developed in view of the problems of such prior art. The present invention provides a honeycomb structure having a circumferential coating layer with a printing area for printing on the surface thereof. In particular, the present invention provides a honeycomb structure capable of improving the readability of characters and symbols printed in the printing areas of the circumferential coating layers, and a manufacturing method of the same.

According to the present invention, there are provided a honeycomb structure and a manufacturing method of the same as follows.

[1] A honeycomb structure, including: a pillar-shaped honeycomb structure body having a porous partition wall disposed so as to surround a plurality of cells extending from a first end face to a second end face, and a circumferential coating layer composed of a circumferential coating material coated on at least a part of circumference of the honeycomb structure body, wherein the circumferential coating layer has a printing area for printing on the surface thereof, the printing area has a lightness (L*) in L*a*b* color space (CIE1976) defined by International Commission on Illumination (CIE) of 35 or more, and the printing area has a surface roughness Ra of 30 μm or less.

[2] The honeycomb structure according to [1], wherein the circumferential coating layer contains a plurality of aggregate particles and a neck material for bonding the aggregate particles together.

[3] The honeycomb structure according to [1] or [2], wherein the cells in the honeycomb structure body are plugged by plugging portions either at any one end on the first end face side or the second end face side of the honeycomb structure body.

[4] The honeycomb structure according to any one of [1] to [3], wherein the circumferential coating layer is disposed so as to surround the circumference of the honeycomb structure body.

[5] The honeycomb structure according to any one of [1] to [4], wherein the circumferential coating layer includes a laser-color developing component that develops a color differing from the original color by a laser.

[6] The honeycomb structure according to any one of [1] to [5], wherein the circumferential coating layer is formed of a porous material.

[7] The honeycomb structure according to any one of [1] to [6], wherein a content ratio of at least one component of silicon carbide, metallic silicon, magnesium oxide, and aluminum oxide at a part constituting the printing area of the circumferential coating layer is 20% by mass or more with respect to 100% by mass of constituent components of the part.

[8] The honeycomb structure according to any one of [1] to [7], wherein the printing area is for printing an information code.

[9] The honeycomb structure according to [8], wherein the information code is a two-dimensional code.

[10] The honeycomb structure according to [9], wherein a dot size of the two-dimensional code is 0.3 mm to 1.0 mm.

[11] A manufacturing method of a honeycomb structure according to any one of [1] to [10], comprising coating the circumferential coating material to at least a part of circumference of the honeycomb structure body, wherein the circumferential coating material includes, as aggregate particles, at least one selected from the group consisting of fine silicon carbide particles, aluminum oxide particles, cordierite particles, titanium oxide particles, and aluminum nitride particles having an average particle diameter of 1 to 5 μm.

[12] The manufacturing method of a honeycomb structure according to [11], wherein the circumferential coating material is prepared so that a shear stress (Pa) measured by a rotary viscometer at a rotational speed of $2.0 \, s^{-1}$ is 20 to 250 Pa, at a temperature of 25° C.

The honeycomb structure of the present embodiment can improve the readability of characters and symbols printed in the printing areas of the circumferential coating layers. In particular, when a symbol such as a two-dimensional code is printed, a reading error by the reading device is unlikely to occur, and more reliable information can be acquired. The manufacturing method of the honeycomb structure of the present invention can conveniently manufacture the honeycomb structure of the present invention described above.

DESCRIPTION OF THE PREFERRED EMBODIMENTS

Hereinafter, embodiments of the present invention will be described. However, the present invention is not limited to the following embodiments. Therefore, it should be understood that changes, modifications, and the like may be appropriately made to the following embodiments based on ordinary knowledge of a person skilled in the art without departing from the spirit of the present invention.

Figure 1:
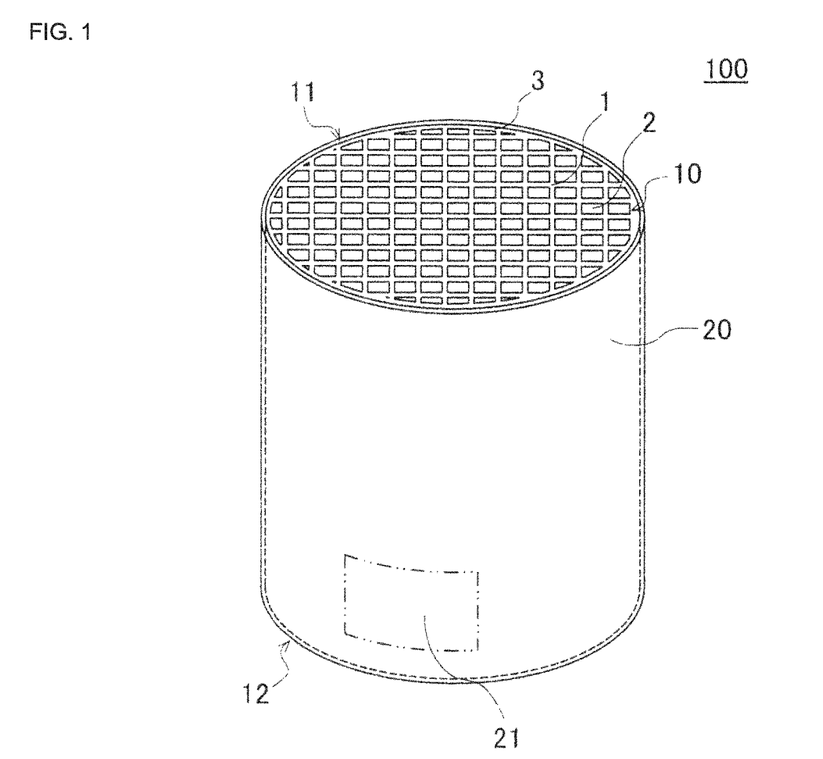
FIG. 1 is a perspective view schematically showing an embodiment of a honeycomb structure of the present invention.

(1) Honeycomb Structure:

One embodiment of the honeycomb structure of the present invention is a honeycomb structure 100 as shown in FIG. 1. FIG. 1 is a perspective view schematically showing one embodiment of the honeycomb structure of the present invention. The honeycomb structure 100 includes a honeycomb structure body 10, and a circumferential coating layer 20 disposed on the circumference of the honeycomb structure body 10.

The honeycomb structure body 10 is of pillar-shaped having a porous partition wall 1. The partition wall 1 is disposed so as to surround a plurality of cells 2 extending from a first end face 11 to a second end face 12 of the honeycomb structure body 10. In the present invention, the cell 2 means the space surrounded by the partition wall 1.

The circumferential coating layer 20 is composed of a circumferential coating material coated on at least a part of circumference of the honeycomb structure body 10. In the honeycomb structure 100 shown in FIG. 1, the honeycomb structure body 10 has a circumferential wall 3 disposed so as to surround the partition wall 1, on the circumferential part thereof. The circumferential coating layer 20 is composed of a circumferential coating material coated on the surface of the circumferential wall 3 of the honeycomb structure body 10. Note that, the honeycomb structure body 10 may not have a circumferential wall 3 on the circumferential part thereof. In such cases, the circumferential coating layers 20 may be disposed directly on the circumferential parts of the partition wall 1 arranged in a grid pattern constituting honeycomb structure body 10.

The circumferential coating layer 20 may be disposed on a part of circumference of the pillar-shaped honeycomb structure body 10, or it may be disposed so as to cover the entire circumference of the pillar-shaped honeycomb structure body 10. The circumferential coating layer 20 is preferably disposed so as to cover the entire circumference of the honeycomb structure body 10 and to be an outer wall for constituting the interface between the honeycomb structure 100 and the outside. That is, it is preferable that the circumferential coating layer 20 is disposed so as to surround the circumference of the honeycomb structure body 10.

The circumferential coating layer 20 has a printing area 21 for printing on the surface thereof. The printing area 21 is an area for printing, for example, the product management information of the honeycomb structure 100. The size of the printing area 21 is not particularly limited, and can be appropriately determined in accordance with the size of the printing on the honeycomb structure 100. For example, the size of the printing area 21 is preferably 80 mm in one direction and 60 mm in the direction orthogonal to the one direction. In addition, the area of the printing area 21 is preferably 4500 to 5500 $mm^2$. The entire surface of the circumferential coating layer 20 may be used as the printing area 21.

The printing area 21 of the circumferential coating layer 20 has a lightness (L*) in L*a*b* color space (CIE1976) defined by International Commission on Illumination (CIE) of 35 or more. Also in the circumferential coating layer 20, the printing area 21 has a surface roughness Ra of 30 μm or less. With this configuration, it is possible to improve the readability of characters and symbols printed in the printing area 21 of the circumferential coating layer 20. In particular, when a symbol such as a two-dimensional code is printed, a reading error by the reading device is unlikely to occur, and more reliable information can be acquired. Note that, the lightness (L*) of the printing area 21 of the circumferential coating layer 20 is 35 or more means that the circumferential coating layer 20 has a printing area 21 of a predetermined range (area) with the lightness (L*) of 35 or more.

The lightness (L*) of the printing area 21 is a L* value in L*a*b* color space (CIE1976) defined by International Commission on Illumination (CIE). The L* value is a value between 0 to 100 that indicates the lightness of the color. The closer it is to 0, the darker it is, the closer it is to 100, the brighter it is. The a* value represents the red-green position of the color, with a positive value indicating the red-side color and a negative value indicating the green-side color. The b* value represents the yellow-blue position of the color, with a positive value indicating the yellow-side color and a negative value indicating the blue-side color. The lightness (L*) of the printing area 21 can be measured by a spectral colorimeter. As the spectral colorimeter, "CM-2600d/2500d (trade name)" manufactured by Konica Minolta Japan, Inc., for example, can be used. The lightness (L*) of the printing area 21 can be measured according to the method defined by International Commission on Illumination (CIE) or the method according to the method (e.g. JIS Z 8781-4 and JIS Z 8781-5 of the Japanese Industrial Standard).

While the theoretical upper limit of the lightness (L*) is 100 as described above, a substantial upper limit of the lightness (L*) of the printing area 21 of the circumferential coating layer 20 can be 80, for example. Therefore, the lightness (L*) of the printing area 21 is preferably 35 to 80. A lower limit of the lightness (L*) of the printing area 21 is preferably 40, more preferably 45, and particularly preferably 50.

In the honeycomb structure 100, the circumferential coating layer 20 has a surface roughness Ra of the printing area 21 of 30 μm or less. With this configuration, it is possible to improve the readability of characters and symbols printed in the printing area 21 of the circumferential coating layer 20. In particular, when a symbol such as a two-dimensional code is printed, a reading error by the reading device is unlikely to occur, and more reliable information can be acquired.

The surface roughness Ra (arithmetic average roughness) of the printing area 21 can be calculated by the contact type surface roughness meter. For example, as a device for measuring the surface roughness Ra, "Form Talysurf S5K (trade name)" manufactured by Taylor Hobson, for example, can be used.

The surface roughness Ra of the printing area 21 can be adjusted by, for example, adjusting the viscosity of the circumferential coating material coated on the circumference of the honeycomb structure body 10. The circumferential coating material can be prepared by adding a bonding material for bonding aggregate particles to each other, water, various organic binders, and the like to aggregate particles constituting the circumferential coating layer 20. At this time, by changing the amount of water or organic binder added, the viscosity of the circumferential coating material can be adjusted. The bonding material becomes a neck material in the circumferential coating layer 20. The organic binder is a material for imparting appropriate viscosity, shape retention, and water retention for applying a circumferential coating material. The viscosity of the circumferential coating material can be defined by measuring the shear stress (Pa) of the circumferential coating material. The shear stress (Pa) is a value measured by a rotary viscometer at a rotational speed of 2.0 $s^{-1}$ at a temperature of 25° C. The circumferential coating material is preferably prepared so that the shear stress (in other words, the viscosity) is 20 to 250 Pa, and particularly preferably 50 to 150 Pa. When the shear stress of the circumferential coating material is less than 20 Pa, or exceeds 250 Pa, the surface roughness Ra of the printing area 21 is likely to exceed 30 μm.

More preferably, the circumferential coating layer 20 has a surface roughness Ra of 30 μm or less over the entire surface including the printing area 21.

The position of the printing area 21 in the circumferential coating layer 20 is not particularly limited. For example, it is preferable that the printing area 21 is disposed on the surface of the circumferential coating layer 20 so as to be closer to end face side of either the first end face 11 or the second end face 12.

It is preferable that the circumferential coating layer 20 contains a plurality of aggregate particles and a neck material for bonding the aggregate particles together. It is further preferable that the above-mentioned aggregate particles contain at least one selected from the group consisting of fine silicon carbide particles, aluminum oxide particles, cordierite particles, titanium oxide particles, and aluminum nitride particles having a particle diameter of 1 to 5 μm.

The lightness (L*) of the circumferential coating layer 20 is reduced by including at least one selected from the group described above. For example, fine silicon carbide particles having a particle diameter of 1 to 5 μm tend to exhibit a color close to white compared to coarse silicon carbide particles having a larger particle diameter than the fine silicon carbide particles. For example, the coarse silicon carbide particles exhibit a relatively black color, and fine silicon carbide particles having a particle diameter of 1 to 5 μm exhibit a relatively gray color. In addition, the aluminum oxide particles exhibit a relatively white color. The cordierite particles exhibit a relatively pale grayish yellow color. The titanium oxide particles and the aluminum nitride particles exhibit a relatively white color. As described above, the value of the lightness (L*) of the printing area 21 of the circumferential coating layer 20 can be made higher (for example, 35 or more) by adjusting the content ratio of at least one selected from the group described above as aggregate particles of the circumferential coating material. If the lightness (L*) of the printing area 21 can be set to 35 or more by including an appropriate amount of the above-mentioned aggregate particles, the circumferential coating material may further include, for example, coarse silicon carbide particles having a particle diameter greater than 5 μm or other materials, as the aggregate particle. The other materials described above can include, for example, mullite, zirconia, zirconium phosphate, silicon nitride, ceramic fibers, grinding debris or pulverized powder of silicon carbide-based honeycomb structure.

The circumferential coating layer 20 may include a laser-color developing component that develops a color different from the original color by a laser. For example, the laser-color developing component include silicon carbide, titanium oxide, aluminum nitride, and the like. By including such a laser-color developing component, it is possible to satisfactorily perform desired printing on the circumferential coating layer 20 by irradiating the circumferential coating layer 20 with a laser. In particular, each of the above-mentioned laser-color developing components can made the color developing properties at the time of laser irradiation (i.e., printability by a laser) excellent. For example, by irradiating the printing area 21 of the circumferential coating layer 20 with a laser such as an infrared laser of a predetermined wavelength, only the irradiated part irradiated with the laser develops the color to black and changes.

The circumferential coating layer 20 may not include the above-mentioned laser-color developing component. For example, when the circumferential coating layer 20 does not contain a laser-color developing component, printing can be performed on the printing area 21 by a method such as ink-jet printing.

In the part constituting the printing area 21 of the circumferential coating layer 20, it is preferable that the content ratio of at least one component of silicon carbide, metal silicon, magnesium oxide, and aluminum oxide is 20% by mass or more with respect to 100% by mass of the constituent component. In addition, it is one of the preferred forms that the component of one of silicon carbide, metal silicon, magnesium oxide, and aluminum oxide described above is a component having the highest content ratio at the part constituting the printing area 21. Hereinafter, a component having the highest content ratio in its constituent components may be referred to as "main component". For example, even if each content ratio of the above-mentioned 4 components is less than 20% by mass, when the content ratio of one of the above-mentioned 4 components is highest at the part constituting the printing area 21, the component is a main component.

In the honeycomb structure 100 of the present embodiment, it is preferable that the printing performed on the printing area 21 is an information code. It is more preferable that the above-mentioned information code is a two-dimensional code. According to the honeycomb structure 100 of the present embodiment, even if the information code is a two-dimensional code, reading errors by the reading device are less likely to occur, and more reliable information can be acquired. The dot size of the two-dimensional code is not particularly limited, but is preferably 0.3 to 1.0 mm, for example.

The thickness of the circumferential coating layer 20 is not particularly limited. For example, the thickness of the circumferential coating layer 20 is preferably 0.05 to 4.0 mm. If the thickness is less than 0.05 mm, the honeycomb structure body 10 may be exposed. Conversely, if the thickness exceeds 4.0 mm, the honeycomb structure 100 may deviate from dimensional tolerance and pressure loss may increase.

The thickness of the partition wall 1 constituting the honeycomb structure body 10 is not particularly limited. For example, the thickness of the partition wall 1 is preferably 0.20 to 0.50 mm, and more preferably 0.25 to 0.45 mm from the viewpoint of ease of manufacturing. If the thickness is less than 0.20 mm, the strength of the honeycomb structure 100 may deteriorate, and if the thickness exceeds 0.50 mm, the pressure loss may increase when the honeycomb structure 100 is used as a filter. The thickness of the partition wall 1 is a mean value measured by microscopic examination of the axial cross section.

The porosity of the partition wall 1 is preferably 30 to 70%, more preferably 40 to 65%. The porosity of the partition wall 1 is a value measured by the mercury press-in method. The porosity of the partition wall 1 can be measured by using, Autopore 9500 (trade name) manufactured by Micromeritics Co., for example. The porosity can be measured by cutting out a part of the partition wall 1 to obtain a test piece and using the test piece; If the porosity of the partition wall 1 is less than 30%, the pressure loss may increase when the honeycomb structure 100 is used as a member for purifying exhaust gas. If the porosity of the partition wall 1 exceeds 70%, the strength of the honeycomb structure 100 may deteriorate.

The shape of the cells 2 formed in the honeycomb structure body 10 is not particularly limited. For example, the cells 2 may have various shapes, such as a polygonal shape, a circular shape, and an elliptic shape, in a section orthogonal to the extending direction of the cells 2. Examples of the polygonal shape may include a triangle, a quadrangle, a pentagon, a hexagon, and an octagon. The shape of the cell 2 is preferably a triangle, a quadrangle, a pentagon, a hexagon, and an octagon. For the shape of the cells 2, all of the cells 2 may have the same shape or the cells 2 may have different shapes. For example, although not shown, quadrangular cells and octagonal cells may be combined. For the size of the cells 2, all of the cells 2 may have the same size, or the cells 2 may have different sizes. For example, although not shown, some of the plurality of cells may be larger, and other cells may be relatively smaller.

The cell density of the cell 2 defined by the partition wall 1 is not particularly limited. For example, the cell density is preferably 5 to 63 cells per $cm^2$, and more preferably 31 to 54 cells per $cm^2$.

The method of forming the circumferential coating layer 20 on the circumference of the honeycomb structure body 10 is not particularly limited, and a conventionally known method can be used. Examples of the method include coating a circumferential coating material prepared so as to have a desired viscosity by, for example, the following method or the like. Place a honeycomb structure body on the turntable and rotated it, and, while discharging the circumferential coating material from the blade-shaped coating nozzle, press the coating nozzle along the circumference of the honeycomb structure body to coat. In this way, the circumferential coating material can coat with a uniform thickness.

The entire shape of the honeycomb structure 100 is not particularly limited. For example, the entire shape of the honeycomb structure 100 shown in FIG. 1 is a pillar shape in which the first end face 11 and the second end face 12 are circular. In addition, although not shown, the entire shape of the honeycomb structure may be a pillar shape in which the first end face and the second end face are substantially circular such as an elliptical shape or racetrack shape or an oval shape. Further, the entire shape of the honeycomb structure may be a prismatic shape in which the first end face and the second end face are polygon such as a square or hexagon.

Although the material constituting the partition wall 1 is not particularly limited, at least one material selected from the group of following materials is preferred from the viewpoint of strength, thermal resistance, durability, and the like. The material group includes silicon carbide, silicon-silicon carbide based composite material, silicon nitride, cordierite, mullite, alumina, spinel, silicon carbide-cordierite based composite material, lithium aluminum silicate, aluminum titanate, and Fe—Cr—Al based metals. Among these, silicon carbide or silicon-silicon carbide composite material is more preferable. Silicon-silicon carbide based composite material is a composite material which includes the silicon carbide (SiC) as an aggregate and silicon (Si) as a binder.

In honeycomb structure 100, the partition wall 1 defining a plurality of cells 2 may be loaded with a catalyst. Loading of the catalyst to the partition wall 1 means that the catalyst is coated on the surface of the partition wall 1 and the inner wall of pore formed on the partition wall 1. With this structure, CO, NOx, HC, and the like in exhaust gas can be made harmless by catalytic reaction. In addition, when the honeycomb structure 100 is used as an exhaust gas purifying filter, oxidization of particulate matter such as trapped soot can be accelerated.

Figure 2:
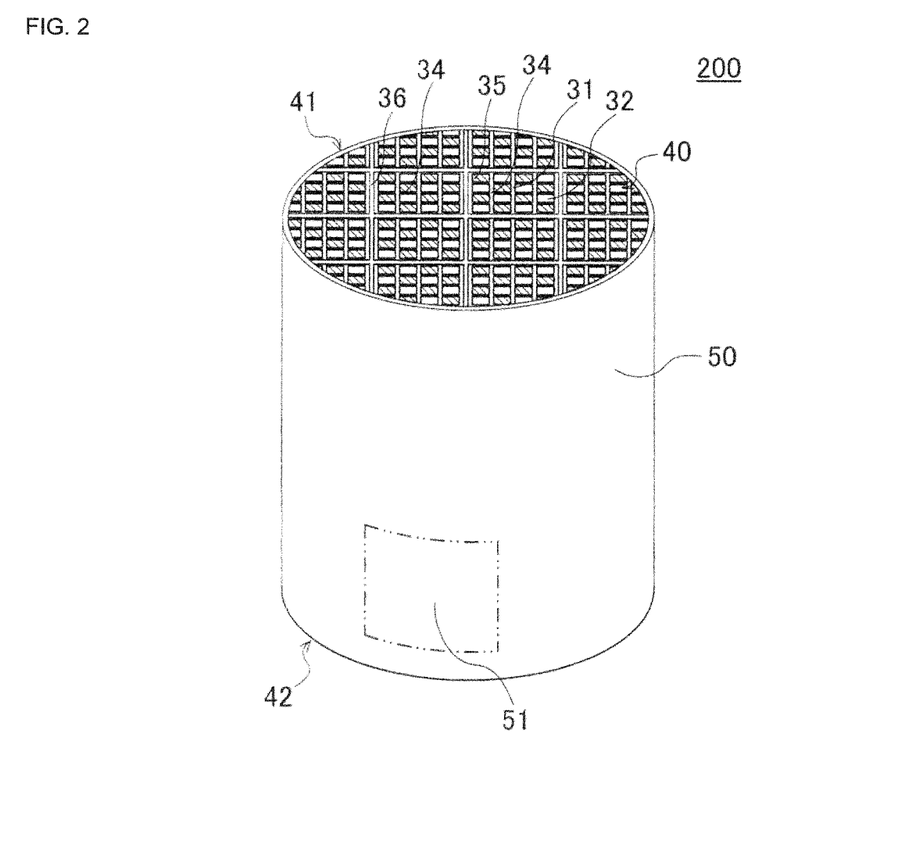
FIG. 2 is a perspective view schematically showing another embodiment of a honeycomb structure of the present invention.

Next, another embodiment of the honeycomb structure of the present invention will be described referring to FIG. 2. FIG. 2 is a perspective view schematically showing another embodiment of the honeycomb structure of the present invention. The honeycomb structure 200 shown in FIG. 2 is, so-called, the honeycomb structure 200 of segmented structure. The honeycomb structure 200 includes a honeycomb structure body 40 of segmented structure, and a circumferential coating layer 50 disposed so as to surround the circumference of the honeycomb structure body 40.

The honeycomb structure body 40 includes a plurality of the honeycomb segments 34 and a bonding layer 36. The honeycomb segment 34 has a porous partition wall 31 disposed so as to surround a plurality of cells 32 extending from the first end face 41 to the second end face 42. The honeycomb segment 34 further has a segment outer wall on the circumferential part thereof so that the entire shape is configured to be, for example, a prismatic shape.

In the plurality of the honeycomb segments 34, the side surfaces of the honeycomb segments 34 are bond to each other via a bonding layer 36. Thus, the bonded body in which the plurality of the honeycomb segments 34 are bonded via the bonding layer 36 is the honeycomb structure body 40 in the honeycomb structure 200. The circumferential coating layer 50 is disposed so as to surround the circumference of the honeycomb structure body 40. The circumferential coating layer 50 is an outer wall for constituting the boundary between the honeycomb structure 200 and the outside.

In the cell 32 in each honeycomb segment 34, either end of the first end face 41 side or the second end face 42 side is plugged with a plugging portion 35. That is, the plugging portion 35 is disposed on the open end of the first end face 41 of the predetermined cell 32 and the open end of the second end face 42 of the remaining cells 32 other than the predetermined cell 32, in each honeycomb segment 34. The honeycomb structure 200 can be suitably used as exhaust gas purifying filters to remove particulate matter in exhaust gas. Although FIG. 2 shows the example of the case where either end of the cell 32 is plugged with the plugging portion 35, the plugging portion 35 is not an essential component, and is an optional component when the honeycomb structure 200 is used as an exhaust gas purifying filter. For example, also in the honeycomb structure 100 shown in FIG. 1, either end of the cell 2 may be plugged with a plugging portion (not shown).

In the honeycomb structure body 40, a part of the circumferential part thereof may be processed by grinding or the like depending on the entire shape of the honeycomb structure 200. For example, among the plurality of the honeycomb segments 34 constituting the honeycomb structure body 40, the honeycomb segment 34 disposed on the outermost circumference of the honeycomb structure body 40 so as to be in contact with the circumferential coating layer 50 is referred to as "circumferential segment", and among the plurality of the honeycomb segments 34, the honeycomb segment 34 other than the circumferential segment is referred to as "central segment". The shape of the central segment is preferred to be a prismatic shape in which the sectional shape perpendicular to the axial direction of the central segment is quadrangle. As for the shape of the circumferential segment, a part of the prismatic shape may be processed by grinding or the like depending on the entire shape of the honeycomb structure 200, and example of the shape prior to processing includes a triangle and a quadrangle.

The material constituting the honeycomb segment 34 is not particularly limited. As the material constituting the honeycomb segment 34, for example, at least one material selected from the group of materials exemplified as a material constituting the partition wall 1 (see FIG. 1) in one embodiment (the honeycomb structure 100 shown in FIG. 1) of the present invention is preferred.

The partition wall 31 and the cell 32 in the honeycomb segment 34 are preferably configured similarly to the partition wall 1 (see FIG. 1) and the cell 2 (see FIG. 1) in one embodiment (the honeycomb structure 100 shown in FIG. 1) of the present invention except that the honeycomb structure body 40 is segmented structure.

The material of the bonding layer 36 is not particularly limited. As the material of the bonding layer 36, for example, a material of the bonding layer in a conventionally known honeycomb structure of segmented structure can be used.

The material of the plugging portion 35 is not particularly limited. The material of plugging portion 35 is preferably a material similar to that of the material exemplified as a material constituting the honeycomb segment 34, for example.

(2) Manufacturing Method of Honeycomb Structure:

The manufacturing method of the honeycomb structure of the embodiment is not particularly limited, and it can be manufactured by the following method, for example. First, a plastic kneaded material for making honeycomb structure body is prepared. The kneaded material for making the honeycomb structure body can be prepared by adding, as appropriate, an additive such as a binder, and water to a material selected from the above-mentioned suitable materials of the partition wall as a raw material powder.

Next, kneaded material thus obtained is extruded to produce a honeycomb formed body having a partition wall disposed so as to surround a plurality of cells. When manufacturing honeycomb structure of segmented structure, a plurality of prismatic shaped honeycomb formed body for honeycomb segments are produced.

Next, the obtained honeycomb formed body is dried, for example, with microwaves and hot air. Next, open ends of the cells of the honeycomb formed body are plugged as required. As a material for plugging the open ends of the cells, a material similar to the material used for producing the honeycomb formed body can be used. The plugged part of open end of the cell is plugging portion in the honeycomb structure. Note that, after plugging open ends of the cells, the honeycomb formed body may be dried again.

Next, the honeycomb formed body is fired to obtain honeycomb fired body. When producing a honeycomb structure 100 as shown in FIG. 1, the obtained honeycomb fired body is the honeycomb structure body 10. When producing a honeycomb structure 200 as shown in FIG. 2, the obtained honeycomb fired body is the honeycomb segments 34. The firing temperature and firing atmosphere will vary depending on the raw materials, and those skilled in the art will be able to select the firing temperature and firing atmosphere that are optimal for the materials selected.

Next, when manufacturing a honeycomb structure of segmented structure, a plurality of the honeycomb segments are bonded to each other using a bonding material. Next, the circumferential part of bonded member of the honeycomb segment is processed by grinding or the like so as to have a desired shape. As described above, the honeycomb structure body of segmented structure can be produced. When manufacturing a honeycomb structure 100 as shown in FIG. 1, the circumferential part of the obtained honeycomb fired body may be subjected to grinding or the like to remove the circumferential wall 3 of the honeycomb fired body (see FIG. 1). The shape of the honeycomb fired body can be a desired shape by performing such grinding. For example, when the shape of the honeycomb fired body has deformation or the like due to firing shrinkage or the like during firing, it is possible to shape the honeycomb fired body by performing grinding on the circumferential part. The method of grinding is not particularly limited, and the grinding can be performed in accordance with a method used in manufacturing a conventionally known honeycomb structure having circumferential coating layers.

Next, a circumferential coating material for producing a circumferential coating layer is prepared. The circumferential coating material is preferably prepared by mixing aggregate particles made of ceramics with a binder for bonding the aggregate particles together, as appropriate, an organic binder, dispersing agent, surfactant, dispersing medium, pore former, clay, and the like.

It is further preferable that aggregate particles contain at least one selected from the group consisting of fine silicon carbide particles, aluminum oxide particles, cordierite particles, titanium oxide particles, and aluminum nitride particles having an average particle diameter of 1 to 5 μm. When fine silicon carbide particles having an average particle diameter of 1 to 5 μm are used, coarse silicon carbide particles having an average particle diameter of more than 5 μm (e.g., an average particle diameter of 10 to 30 μm) may be used together. The lightness (L*) of the circumferential coating layers formed by the circumferential coating material can be adjusted to be 35 or more by adjusting the material selection of the aggregate particles and the blending ratio thereof. For the aggregate particles, it is preferable that each particle is uniformly dispersed. The average particle diameter of the aggregate particles is a value determined by particle size measurement using the laser diffraction/scattering method.

The binder is a neck material that bonds the aggregate particles together. Examples of the binder include colloidal silica. In the blending of the circumferential coating material, when the sum of the aggregate particles and the binder is set to 100% by mass, the blending ratio of the binder is preferably 20 to 35% by mass, and more preferably 25 to 30% by mass.

For the binder, it is preferable to include a colloidal oxide in which a polymer is dispersed. By including a colloidal oxide in which a polymer is dispersed, shrinkage of a circumferential coating material during drying can be suppressed. As the colloidal oxide, for example, it is more preferable to employ colloidal silica.

The viscosity of the circumferential coating material can be defined by measuring the shear stress (Pa) of the circumferential coating material. The shear stress of the circumferential coating material is preferably 20 to 250 Pa. When the shear stress of the circumferential coating material is less than 20 Pa, or more than 250 Pa, the surface roughness Ra of the printing area is likely to exceed 30 μm. The shear stresses of the circumferential coating material can be adjusted by organic binder, dispersing medium, and the like added to the circumferential coating material.

The dispersing medium can include water. Examples of the suitable one of the organic binders include methylcellulose, hydroxypropoxyl methylcellulose, carboxyl methylcellulose, polyvinyl alcohol, and the like.

Examples of the suitable one of the dispersing agents include polyethylene glycol, polyvinyl alcohol, polyoxyethylene alkyl ether, polyethylene glycol fatty acid ester, and the like. Examples of the suitable one of the clays include a clay mineral such as bentonite and montmorillonite.

Next, a circumferential coating material is coated on the circumference of the produced honeycomb structure body to produce a circumferential coating layer. The coating method of the circumferential coating material is not particularly limited, and the coating can be performed according to a method used in manufacturing a conventionally known honeycomb structure having a circumferential coating layer. As described above, the honeycomb structure of the present invention can be manufactured.

Examples of the coating method of the circumferential coating material can include the following method. Place a honeycomb structure body (in other words, honeycomb fired body described above) on the turntable and rotated it, and, while discharging the circumferential coating material from the blade-shaped coating nozzle, press the coating nozzle along the circumference of the honeycomb structure body to coat. In this way, the circumferential coating material can coat with a uniform thickness.

If the circumferential surface of the honeycomb structure body has been grinded and the circumferential wall has been removed, the circumferential coating material is to be coated on the entire circumferential surface of the honeycomb structure body to form a circumferential coating. On the other hand, if the circumferential wall is present on the circumferential surface of the honeycomb structure body, or if a part of the circumferential wall has been removed, the circumferential coating material may be partially coated to form the circumferential coating. It is needless to say that the circumferential coating material may be coated to the entire circumferential surface of the honeycomb structure body to form the circumferential coating. The circumferential coating described above is to be the circumferential coating layer.

The method of drying the circumferential coating material coated (that is, the undried circumferential coating material) is not particularly limited. For example, from the viewpoint of preventing drying cracks, a method of removing moisture and organic matter by drying at room temperature if necessary and then holding at 400 to 700° C. for 10 minutes or more in an electric furnace can be suitably used.

The honeycomb structure thus produced has a printing area in which the lightness (L*) in L*a*b* color space (CIE1976) defined by International Commission on Illumination (CIE) is 35 or more in the circumferential coating layer composed of the circumferential coating material. Printing can be performed by irradiating the printing area of the circumferential coating layer with a laser to develop a color developing component (e.g., silicon carbide or titanium oxide) included in the circumferential coating layer. Examples of the printing include an information code such as a two-dimensional code. Suitable examples of a laser beam used in printing by the laser include a $CO_2$ laser, a YAG laser, and a $YVO_4$ laser. The condition of the laser for irradiating the laser beam can be appropriately selected depending on the type of the laser to be used. For example, when the $CO_2$ laser is used, marking is preferably performed at a power of 15 to 25 W and a scanning speed of 400 to 600 mm/s. By marking in this manner, the irradiated part develops the color so as to exhibit a dark color such as black to green, and the contrast with the non-irradiated part due to the color development becomes extremely good. When the honeycomb structure is loaded with the catalyst, even after printing by the above laser is performed, the printed part is not deteriorated, and even after the catalyst loading, the above printing can be read well. The catalyst loading method is not particularly limited, and it can be carried out according to the catalyst loading method performed in the conventional manufacturing method for the honeycomb structure.

EXAMPLES

Hereinafter, the present invention will be described more specifically by examples, but the present invention is not limited in any way by these examples.

Example 1

To the silicon carbide-metallic silicon raw material powder mixed so that the composition after firing was silicon carbide:metallic silicon=80:20, a forming aid, pore former, and water were added, mixed, and kneaded to prepare a kneaded material.

Next, the obtained kneaded material was molded using a vacuum extruder to produce 16 pieces of the honeycomb formed body having quadrangular prism-shaped.

Next, the obtained honeycomb formed body was dried using high frequency dielectric heating, and then dried using a hot air dryer at 120° C. for 2 hours.

Next, plugging portion was formed on the honeycomb formed body after drying. Specifically, at first, a first end face of the honeycomb formed body was masked so that a predetermined cell was covered. An end of the first end face side of the masked honeycomb formed body was then immersed in a plugging slurry containing a raw material of a plugging material to form a plugging portion, and open end of the remaining unmasked cells was filled with the plugging slurry. Next, a second end face of the honeycomb formed body was masked so that the remaining cells were covered in a manner similar to that described above, and open end of the predetermined unmasked cell was filled with a plugging slurry.

The honeycomb formed body on which plugging portion was formed was degreased and fired to obtain honeycomb segments. The condition of degreasing was set to 5 hours at 400° C., and the condition of firing was set to 1.5 hours at 1450° C. under an argon atmosphere.

As described above, the honeycomb segments used for manufacturing the honeycomb structure of Example 1 were produced. In each honeycomb segment, a section perpendicular to the axial direction is square, and the length of one side of the square (segment size) was 42 mm. The honeycomb segment had a length of 141.0 mm in the axial direction. The honeycomb segment had a partition wall thickness of 0.305 mm and a cell density of 46.5 cells/cm$^2$.

Next, a bonding material for bonding the honeycomb segments was prepared. An organic binder, foamable resin, and dispersing agent were added to an inorganic raw material for constituting a bonding layer as an additive, and further, water was added and kneaded into a slurry state, and it was used as a bonding material.

The obtained honeycomb segments were then bonded with the bonding material, with the honeycomb segments positioned adjacently such that their sides face each other. On the end face of the bonded body of the honeycomb segment, the honeycomb segments were disposed so as to be arranged in four in the longitudinal direction and four in the transverse direction. Thereafter, a bonding layer in the bonded body of the honeycomb segment was dried and cured, and further subjected to heat treatment. Then, the honeycomb structure body in Example 1 was produced by grinding the circumference of the bonded body of the honeycomb segment to round pillar-shaped.

Next, a circumferential coating material was prepared by the following method. First, coarse silicon carbide particles having an average particle diameter of 20 μm, fine silicon carbide particles having an average particle diameter of 3 μm, aluminum oxide particles having an average particle diameter of 4 μm, and cordierite particles having an average particle diameter of 40 μm were prepared as aggregate particles. The average particle diameter is measured by the laser diffraction/scattering method. In addition, colloidal silica was prepared as a binder. These were mixed so that coarse silicon carbide particles are 30 parts by mass, fine silicon carbide particles are 10 parts by mass, aluminum oxide particles are 20 parts by mass, cordierite particles are 15 parts by mass, and colloidal silica are 25 parts by mass. The blending formulation of the aggregate particles are shown in the column of "Coarse silicon carbide", "Fine silicon carbide", "Aluminum oxide" and "Cordierite" in Table 1.

Next, water and an organic binder were further added to the mixed powder obtained by mixing each raw material, and each raw material was mixed to prepare a circumferential coating material. Note that, in the blending amount, when the total mass of the mixed powder was set to 100 parts by mass, water was set to 25 parts by mass and an organic binder was set to 0.1 parts by mass.

The viscosity of the obtained circumferential coating material was determined by measuring the shear stress (Pa) of the circumferential coating material. The shear stresses (Pa) of the circumferential coating material were measured by a rotary viscometer at a rotational speed of 2.0 s$^{-1}$ at a temperature of 25° C. The measurement results are shown in Table 1.

Next, the circumferential coating material was coated on the circumference of the previously produced honeycomb structure body, and the coated circumferential coating material was dried to produce circumferential coating layers. The thickness of the circumferential coating layer was about 0.2 mm. The honeycomb structure thus produced was the honeycomb structure of Example 1. The honeycomb structure of Example 1 had the end face diameter of 165.0 mm. In Example 1, 10 honeycomb structures were prepared in the manner described above.

For the honeycomb structure of Example 1, the part of 20 mm from the second end face side of the circumferential coating layer was the printing area. The lightness (L*) in L*a*b* color space (CIE1976) defined by International Commission on Illumination (CIE) was measured using a spectral colorimeter ("CM-2600d/2500d (trade name)" manufactured by Konica Minolta Japan, Inc.) for the printing areas of the circumferential coating layers. The lightness (L*) was 35. The results are shown in the column of "L*" in Table 2.

Further, the surface roughness Ra (arithmetic average roughness) of the printing area of the circumferential coating layer was calculated by the stylus-type surface roughness meter. Then, the mean value of the surface roughness Ra of the printing area of the circumferential coating layer of the 10 honeycomb structures was determined. The mean was the surface roughness Ra of the printing area of the circumferential coating layer of the honeycomb structure of Example 1. The surface roughness Ra of the printing area of the circumferential coating layer was 10 µm. The results are shown in Table 2.

Next, a part of 20 mm from the second end face side of the circumferential coating layer of the 10 honeycomb structures of Example 1 was defined as printing area, and a two-dimensional code was printed with respect to the printing area. The print size was 16 mm. Printing was performed in the following manner.

The circumferential surface of the honeycomb structure was irradiated with a laser to develop a color developing component (e.g., silicon carbide) contained in the circumferential coating layer, thereby printing a two-dimensional code. The printing with the laser was performed using a $CO_2$ laser marker at a power of 20 W and a scanning speed of 500 mm/s.

Next, a reading test was performed on the printing of the two-dimensional code applied to the printing area by the following method. The printing (two-dimensional codes) on 10 honeycomb structures of Example 1 were read by a two-dimensional code reading device. As the two-dimensional code reading device, "DataMan302x (trade name)" manufactured by COGNEX Corporation was used. Then, for each of the 10 honeycomb structures, readability was evaluated as the evaluations A to D and F according to the "reading grade" in ISO/IEC15415 standards, and judgement was performed. The results are shown in the column of "Reading Test" in Table 2. In the column of "Reading Test", only the alphabetic letters A to D and F are shown. In the two-dimensional code reading device "DataMan302x (trade name)", the evaluation results of the evaluations A to D and F are obtained by evaluating the readability of the two-dimensional code. In the case of the evaluation A, the readability is the best, which means that the readability is sequentially inferior from the evaluation A to the evaluation F. In this two-dimensional code reading device, there is no evaluation result of the evaluation E, and the evaluation D is followed by the evaluation F. In the column of "Reading Test" in Table 2, for example, "D-C" indicates that the evaluation results of the 10 honeycomb structures were either the evaluation D or the evaluation C.

TABLE 1

| | Blending ratio of aggregate particles (in a total of 75 parts by weight) | | | | | |
|---|---|---|---|---|---|---|
| | Coarse silicon carbide (parts by weight) | Fine silicon carbide (parts by weight) | Aluminum oxide (parts by weight) | Cordierite (parts by weight) | Titanium oxide (parts by weight) | Shear stress (Pa) of Circumferential coating material |
| Comparative Example 1 | 40 | 0 | 20 | 15 | 0 | 180 |
| Comparative Example 2 | 40 | 0 | 20 | 15 | 0 | 220 |
| Comparative Example 3 | 40 | 0 | 20 | 15 | 0 | 250 |
| Comparative Example 4 | 40 | 0 | 20 | 15 | 0 | 20 |
| Comparative Example 5 | 40 | 0 | 20 | 15 | 0 | 255 |
| Comparative Example 6 | 40 | 0 | 20 | 15 | 0 | 15 |
| Example 1 | 30 | 10 | 20 | 15 | 0 | 180 |
| Example 2 | 30 | 10 | 20 | 15 | 0 | 220 |
| Example 3 | 30 | 10 | 20 | 15 | 0 | 250 |
| Example 4 | 30 | 10 | 20 | 15 | 0 | 20 |
| Comparative Example 7 | 30 | 10 | 20 | 15 | 0 | 255 |
| Comparative Example 8 | 30 | 10 | 20 | 15 | 0 | 15 |
| Example 5 | 10 | 30 | 20 | 15 | 0 | 180 |
| Example 6 | 10 | 30 | 20 | 15 | 0 | 220 |
| Example 7 | 10 | 30 | 20 | 15 | 0 | 250 |
| Example 8 | 10 | 30 | 20 | 15 | 0 | 20 |
| Comparative Example 9 | 10 | 30 | 20 | 15 | 0 | 255 |
| Comparative Example 10 | 10 | 30 | 20 | 15 | 0 | 15 |
| Example 9 | 10 | 30 | 25 | 10 | 0 | 180 |
| Example 10 | 10 | 30 | 30 | 5 | 0 | 180 |
| Example 11 | 10 | 30 | 35 | 0 | 0 | 180 |
| Example 12 | 10 | 30 | 20 | 10 | 5 | 180 |
| Example 13 | 10 | 30 | 20 | 5 | 10 | 180 |
| Example 14 | 10 | 30 | 20 | 0 | 15 | 180 |
| Example 15 | 0 | 40 | 25 | 0 | 10 | 180 |
| Example 16 | 0 | 40 | 25 | 0 | 10 | 140 |

TABLE 2

| Test Number | L* | Surface roughness Ra (µm) | Reading Test |
|---|---|---|---|
| Comparative Example 1 | 30 | 10 | F |
| Comparative Example 2 | 30 | 20 | F |
| Comparative Example 3 | 30 | 30 | F |
| Comparative Example 4 | 30 | 30 | F |
| Comparative Example 5 | 30 | 35 | F |
| Comparative Example 6 | 30 | 35 | F |
| Example 1 | 35 | 10 | C-D |
| Example 2 | 35 | 20 | C-D |
| Example 3 | 35 | 30 | D |
| Example 4 | 35 | 30 | D |
| Comparative Example 7 | 35 | 35 | F |
| Comparative Example 8 | 35 | 35 | F |

TABLE 2-continued

| Test Number | L* | Surface roughness Ra (μm) | Reading Test |
|---|---|---|---|
| Example 5 | 50 | 10 | C |
| Example 6 | 50 | 20 | C-D |
| Example 7 | 50 | 30 | C-D |
| Example 8 | 50 | 30 | C-D |
| Comparative Example 9 | 50 | 35 | F |
| Comparative Example 10 | 50 | 35 | F |
| Example 9 | 55 | 10 | B-C |
| Example 10 | 60 | 10 | B-C |
| Example 11 | 60 | 10 | B |
| Example 12 | 65 | 10 | B |
| Example 13 | 70 | 10 | A-B |
| Example 14 | 70 | 10 | A-B |
| Example 15 | 75 | 10 | A-B |
| Example 16 | 75 | 5 | A |

Examples 2 to 16 and Comparative Examples 1 to 10

In preparing the circumferential coating material, the blending ratio of the aggregate particles (in a total of 75 parts by mass) was changed as shown in Table 1 to produce the honeycomb structures of Examples 2 to 16 and Comparative Examples 1 to 10 in the same manner as in Example 1. The honeycomb structures of Examples 2 to 16 and Comparative Examples 1 to 10 were also produced 10 pieces, respectively. In Examples 12 to 16, titanium oxide particles were added as the aggregate particle to prepare the circumferential coating material. Specifically, 5 parts by mass of titanium oxide particles were used in Example 12. In Examples 13, 15, and 16, 10 parts by mass of titanium oxide particles were used. In Example 14, 15 parts by mass of titanium oxide particles were used.

In Examples and Comparative Examples, the shear stresses (Pa) of the circumferential coating material in the preparation of the circumferential coating material were changed as shown in Table 1. The shear stress (Pa) of the circumferential coating material was adjusted by increasing or decreasing the amount of water and binder added to the circumferential coating material.

The lightness (L*) in L*a*b* color space (CIE1976) defined by International Commission on Illumination (OE) was measured using a spectral colorimeter for the printing areas of the circumferential coating layers of the honeycomb structures of Examples 2 to 16 and Comparative Examples 1 to 10. The results are shown in Table 2.

The honeycomb structures of Examples 2 to 16 and Comparative Examples 1 to 10 were performed the reading tests in the same manner as in Example 1. The printing applied to the printing areas of the circumferential coating layers of the honeycomb structures were two-dimensional codes similar to those of Example 1. A comprehensive decision was also made based on the reading test. The results are shown in Table 2.

Results

In the honeycomb structures of Examples 1 to 16, the lightness (L*) of the printing area of the circumferential coating layer was 35 or more, the surface roughness Ra was 30 μm or less, and the readability of the printing (two-dimensional codes) applied to the printing area was good. On the other hand, in the honeycomb structures of Comparative Examples 1 to 6, the lightness (L*) of the printing area of the circumferential coating layer was 35 or less, many read errors were confirmed in the printing applied to the printing area, and the readability was poor. In the results, even if the surface roughness Ra of the printing area is 30 μm or less as in honeycomb structure of Comparative Examples 1 to 4, when the lightness (L*) of the printing area is 35 or less, it was confirmed that the readability is extremely poor. Further, in the honeycomb structures of Comparative Examples 7 to 10, even if the lightness (L*) of the printing area is 35 or more, the surface roughness Ra of the printing area is more than 30 μm, and the readability was poor.

A honeycomb structure of the present invention is suitably utilizable as a catalyst carrier for load a catalyst or a filter in various fields such as automobile, chemistry, electric power, iron and steel.

DESCRIPTION OF REFERENCE NUMERALS 1, 31: partition wall, 2, 32: cell, 3: circumferential wall, 10, 40: honeycomb structure body, 11, 41: first end face, 12, 42: second end face, 20, 50: circumferential coating layer, 21, 51: printing area, 34: honeycomb segment, 35: plugging portion, 36: bonding layer, 100, 200: honeycomb structure

The invention claimed is:

1. A honeycomb structure, comprising:
   a pillar-shaped honeycomb structure body having a porous partition wall so as to surround a plurality of cells extending from a first end face to a second end face, and
   a circumferential coating layer composed of a circumferential coating material coated on at least a part of circumference of the honeycomb structure body, wherein
   the circumferential coating layer has a printing area for printing on the surface thereof,
   at a part constituting the printing area of the circumferential coating layer (i) a content ratio of each of silicon carbide and aluminum oxide is 20% by mass or more, and (ii) a content ratio of titanium oxide is 5% by mass to 15% by mass, with respect to 100% by mass of the constituent components of the part, and silicon carbide is a component having the highest content ratio at the part constituting the printing area,
   the printing area has a lightness (L*) in L*a*b* color space (CIE1976) defined by International Commission on Illumination (CIE) of 35 or more, and
   the printing area has a surface roughness (Ra) of 30 μm or less.

2. The honeycomb structure according to claim 1, wherein the circumferential coating layer contains a plurality of aggregate particles and a neck material for bonding the aggregate particles together.

3. The honeycomb structure according to claim 1, wherein the cells in the honeycomb structure body are plugged by plugging portions either at any one end on the first end face side or the second end face side of the honeycomb structure body.

4. The honeycomb structure according to claim 1, wherein the circumferential coating layer is disposed so as to surround the circumference of the honeycomb structure body.

5. The honeycomb structure according to claim 1, wherein the circumferential coating layer includes a laser-color developing component that develops a color differing from the original color by a laser.

6. The honeycomb structure according to claim 1, wherein the circumferential coating layer is formed of a porous material.

7. The honeycomb structure according to claim 1, wherein the printing area is for printing an information code.

8. The honeycomb structure according to claim 7, wherein the information code is a two-dimensional code.

9. The honeycomb structure according to claim 8, wherein a dot size of the two-dimensional codes is 0.3 mm to 1.0 mm.

10. A manufacturing method of the honeycomb structure according to claim 1, comprising coating the circumferential coating material to at least a part of the circumference of the honeycomb structure body, wherein
 the circumferential coating material includes, as aggregate particles, at least one selected from the group consisting of fine silicon carbide particles, aluminum oxide particles, cordierite particles, titanium oxide particles, and aluminum nitride particles having an average particle diameter of 1 to 5 μm.

11. The manufacturing method of the honeycomb structure according to claim 10, wherein the circumferential coating material is prepared so that a shear stress (Pa) measured by a rotary viscometer at a rotational speed of 2.0 $s^{-1}$ is 20 to 250 Pa, at a temperature of 25° C.

\* \* \* \* \*